US008924425B1

(12) United States Patent
Pandey et al.

(10) Patent No.: US 8,924,425 B1
(45) Date of Patent: Dec. 30, 2014

(54) MIGRATING DATA FROM LEGACY STORAGE SYSTEMS TO OBJECT STORAGE SYSTEMS

(71) Applicant: NetApp Inc., Sunnyvale, CA (US)

(72) Inventors: Vineet Pandey, Bangalore (IN); Chhavi Sharma, Bangalore (IN); Ranjit Kumar, Bangalore (IN); Parag Deshmukh, Bangalore (IN); Kaladhar Voruganti, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 62 days.

(21) Appl. No.: 13/707,039

(22) Filed: Dec. 6, 2012

(51) Int. Cl.
*G06F 17/30* (2006.01)
*G06F 9/455* (2006.01)
*G06F 15/173* (2006.01)
*H04L 29/08* (2006.01)

(52) U.S. Cl.
CPC ............ *G06F 17/303* (2013.01); *H04L 67/1023* (2013.01); *G06F 9/45533* (2013.01); *G06F 15/17331* (2013.01)
USPC ............ 707/792; 707/E17.005; 707/E17.014; 709/212; 711/114; 718/1

(58) Field of Classification Search
CPC ..... G06F 3/0644; G06F 3/0619; G06F 3/067; G06F 15/17331; G06F 9/45533; G06F 9/455; G06F 17/301; G06F 17/30147; G06F 17/30067; G06F 17/30182; H04L 67/1023
USPC ......... 707/828, 822, 831, 692, 736, 737, 770, 707/792, E17.044, E17.01, E17.014, 626, 707/638, 640, 705, E17.005, E17.055; 711/156, 118, 162, 114, 154, 202, 100, 711/112, 165, 170, 153, E12.002; 709/226, 709/211, 212, 214, 223; 718/102, 1, 105; 714/758, E11.03; 710/6
See application file for complete search history.

(56) References Cited

U.S. PATENT DOCUMENTS

| 7,072,917 B2 * | 7/2006 | Wong et al. ................... 707/693 |
| 7,512,673 B2 * | 3/2009 | Miloushev et al. ........... 709/221 |
| 7,565,519 B1 * | 7/2009 | Kumar et al. .................... 713/1 |

(Continued)

OTHER PUBLICATIONS

Coles, A. ; Hewlett-Packard Labs. ; Edwards, A.—"Rapid Node Reallocation Between Virtual Clusters for Data Intensive Utility Computing"—Published in: Cluster Computing, 2006 IEEE International Conference on; Date of Conference: Sep. 25-28, 2006; pp. 1-10.*

(Continued)

*Primary Examiner* — Anh Ly
(74) *Attorney, Agent, or Firm* — Cooper Legal Group, LLC

(57) ABSTRACT

One or more techniques and/or systems are provided for migrating a dataset from a file storage system to an object storage system. That is, a snapshot of a file system may be received from the file storage system. The snapshot may comprise file data associated with a file of the file system. The file may be converted into an object using the file data. The object may be stored within a data constituent volume of the object storage system. A namespace volume, used to track objects, may be populated with a redirector that maps a front-end data path (e.g., a path used by clients to reference the object) to a back-end data path that specifies a path to the object within the data constituent volume. In this way, a dataset of one or more files may be migrated from the file storage system to the object storage system.

20 Claims, 9 Drawing Sheets

(56) References Cited

U.S. PATENT DOCUMENTS

| | | | |
|---|---|---|---|
| 7,827,350 B1* | 11/2010 | Jiang et al. | 711/114 |
| 7,831,641 B2* | 11/2010 | Wong et al. | 707/822 |
| 7,831,735 B1* | 11/2010 | Kabra et al. | 709/248 |
| 7,937,453 B1* | 5/2011 | Hayden et al. | 709/219 |
| 7,970,851 B2* | 6/2011 | Ponnappan et al. | 709/211 |
| 7,996,371 B1* | 8/2011 | Deshmukh | 707/692 |
| 8,626,716 B1* | 1/2014 | Katzer et al. | 707/646 |
| 2002/0133491 A1* | 9/2002 | Sim et al. | 707/10 |
| 2003/0120764 A1* | 6/2003 | Laye et al. | 709/223 |
| 2003/0212778 A1* | 11/2003 | Collomb | 709/223 |
| 2005/0114356 A1* | 5/2005 | Bhatti | 707/100 |
| 2008/0275925 A1* | 11/2008 | Kimmel | 707/204 |
| 2010/0094847 A1* | 4/2010 | Malan et al. | 707/705 |
| 2010/0198972 A1* | 8/2010 | Umbehocker | 709/226 |
| 2010/0199037 A1* | 8/2010 | Umbehocker et al. | 711/113 |
| 2010/0199276 A1* | 8/2010 | Umbehocker | 718/1 |
| 2010/0332456 A1* | 12/2010 | Prahlad et al. | 707/664 |
| 2011/0010445 A1* | 1/2011 | Das et al. | 709/224 |
| 2011/0055471 A1* | 3/2011 | Thatcher et al. | 711/114 |
| 2011/0137966 A1* | 6/2011 | Srinivasan et al. | 707/828 |
| 2012/0023290 A1* | 1/2012 | Sugimoto et al. | 711/114 |
| 2012/0124055 A1* | 5/2012 | Deubel et al. | 707/741 |
| 2012/0130949 A1* | 5/2012 | Picken et al. | 707/626 |
| 2012/0185646 A1* | 7/2012 | Ikawa et al. | 711/114 |
| 2012/0290641 A1* | 11/2012 | Enko et al. | 709/203 |
| 2013/0054927 A1* | 2/2013 | Raj et al. | 711/170 |
| 2013/0238572 A1* | 9/2013 | Prahlad et al. | 707/692 |
| 2013/0290648 A1* | 10/2013 | Shao et al. | 711/154 |
| 2013/0326159 A1* | 12/2013 | Vijayan et al. | 711/148 |
| 2013/0346444 A1* | 12/2013 | Makkar et al. | 707/770 |

OTHER PUBLICATIONS

Antero Taivalsaari—"Delegation versus concatenation or cloning is inheritance too"—Published in: Newsletter ACM SIGPLAN OOPS Messenger Homepagearchive—vol. 6 Issue 3, Jul. 1995—pp. 20-49.*

* cited by examiner

MIGRATING DATA FROM LEGACY STORAGE SYSTEMS TO OBJECT STORAGE SYSTEMS

FIELD

The instant disclosure pertains to migrating a dataset from a file storage system to an object storage system.

BACKGROUND

A file storage system may comprise one or more storage devices. The file storage system may maintain one or more volumes comprising files and/or file systems within the one or more storage devices. For example, a first volume comprising a first file system may be maintained within a first storage device, a second volume comprising a second file system may be maintained within a second storage device, etc. The file storage system may provide users with access to files stored within the first file system, the second file system, and/or other file systems.

The file storage system may provide storage functionality, such as snapshot difference functionality and/or snapshot backup, at a volume level, for example. In one example, the file storage system may provide snapshot backup functionality for a volume. The file storage system may create a snapshot comprising a point in time representation of the volume. The snapshot may be used to restore the point in time representation of the volume (e.g., in the event the volume fails). In another example, the file storage system may create a primary volume to secondary volume relationship. In particular, a primary volume may be directly paired with a secondary volume, such that the secondary volume may be configured as a redundant backup storage volume for the primary volume. When data is mirrored from the primary volume to the secondary volume, merely the changes of data are propagated from the primary volume to the secondary volume. The file storage system may provide such functionality as a result of files being stored within the confines of a single volume or a primary volume to secondary volume relationship. For example, the file storage system may mirror data and/or send difference data from the primary volume to the secondary volume because the file storage system may have declared the primary volume and secondary volume relationship beforehand. In this way, the file storage system may be limited to managing the storage of files within the confines of a volume concept.

An object storage system differs from a file storage system in that data is stored as objects, as opposed to files. In particular, the object storage system may represent objects to clients through a single front-end object volume that may grow or shrink in size without affecting how the clients reference such objects (e.g., a single infinite volume). In this way, the object volume is abstracted away from the actual storage of the objects by the object storage system. Instead of storing objects within a single physical volume that corresponds to the object volume, the objects may be stored across a plurality of data constituent volumes. Because the object volume may be derived from multiple data constituent volumes (e.g., a one-to-many mapping), a namespace volume may be used to track locations of objects within the data constituent volumes. For example, the volume namespace may store redirectors that map front-end data paths (e.g., a data path used by a client to reference an object) to back-end data paths (e.g., a data path to a storage location of the object within a data constituent volume). In this way, the namespace volume may be used to locate objects within the plurality of data constituent volumes. When an object is moved between data constituent volumes, a redirector for the object may be updated to reflect the new location of the object without affecting the front-end data path used by the client to reference the object. Accordingly, the object storage system provides a flexible storage solution where data is stored as objects, and such objects may be moved between data constituent volumes without affecting clients (e.g., an object may be moved from an over utilized data constituent volume to an underutilized data constituent volume). Data constituent volumes may be added, removed, and/or modified within the object storage system without affecting operation of the object storage system (e.g., the object volume represented to the client may grow or shrink over time). In this way, the object storage system is not constrained to working without the bounds of a volume concept.

Because of the inherent differences in how a file storage system and an object storage system store data, a file storage system may not be capable of being directly upgraded to an object storage system. Instead, files may be migrated one at a time from the file storage system to the object storage system. In particular, a file may be retrieved from the file storage system, the file may be converted to an object, the object may be stored within a data constituent volume, and an entry may be made within the namespace volume that references the location of the object within the data constituent volume. Migrating data on a file-by-file basis may be inefficient where a large number of files are to be migrated from the file storage system to the object storage system.

SUMMARY

The disclosure relates to one or more techniques and/or systems for migrating a dataset from a file storage system to an object storage system. That is, a snapshot of a file system may be received from the file storage system. For example, an object storage controller may receive the snapshot from a snapshot backup utility associated with the file storage system. The snapshot may comprise a point in time representation of a volume associated with the file system. In this way, the snapshot may comprise file data associated with a file of the file system (e.g., a point in time representation of the file or a portion of the file). In one example, the file data may comprise data of the file (e.g., where a version of the file has not been previously migrated to the object storage system) or a data difference between a current version of the file and a prior version of the file (e.g., where the prior version of the file was previously migrated to the object storage system). It may be appreciated that the snapshot may comprise file data associated with other files within the file storage system. For example, the snapshot may comprise a point in time representation of files stored within the volume associated with the file system. It may be appreciated that a plurality of snapshots may be received through one or more data streams, and that the one or more data streams may be queued for processing based upon priorities assigned to respective data streams.

Because the object storage system may store data as objects within one or more data constituent volumes, the file may be converted into an object for storage within a data constituent volume. In particular, the file may be converted into the object using the file data within the snapshot. The file data may comprise data of the file (e.g., an array of data bytes comprising data represented by the file) and/or metadata of the file (e.g., file ownership, file creation time, file modification time, etc.). An object layer (e.g., a data wrapper) may be added to the data of the file to create the object (e.g., the data wrapper may be wrapped around the data of the file to create the object). In this way, the object may be represented, by the object layer wrapped around the data of the file, as a single data glob that may be written and/or read as a single glob. Once the object is created, a determination may be made as to whether a prior object version of the object exists within at least one data constituent volume of the object storage system (e.g., a prior version of the file may have been previously migrated to the object storage system).

Responsive to determining that the prior object version of the object does not exist, the object may be stored within a first data constituent volume of the object storage system. In one example, the first data constituent volume may be selected based upon a service level objective for the file (e.g., a storage space efficiency objective, a reliability objective, a cost objective, a performance objective, a security objective, etc.). For example, the first data constituent volume may be selected because the first data constituent volume has a data access rate characteristic that corresponds to a performance objective for the file. The object storage system may comprise a namespace volume. The namespace volume may comprise one or more redirectors that track locations of objects stored within the one or more data constituent volumes. As such, an entry may be created within the namespace volume for the object. The entry may comprise a redirector that maps a front-end data path for the object (e.g., a data path used by a client to reference the object) to a back-end data path that specifies a path for the object within the first data constituent volume. In this way, the user may reference the object using the front-end data path regardless of whether the object has been moved between data constituent volumes (e.g., merely the back-end data path may be updated based upon migration of the object within the object storage system). It may be appreciated that first, second, etc. and/or the like are generally used herein merely as names, indicators, designators, etc., and are not necessarily intended to imply an ordering, temporal aspect, importance, etc. For example, a 'first' data constituent volume is not necessarily ordered before a 'second' data constituent volume. Accordingly, the instant application, including the scope of the claims, is not intended to be limited by such naming convention, for example.

Responsive to determining that the prior object version of the object does exist within a second data constituent volume of the object storage system (e.g., the object may have been previously migrated to the second data constituent volume as the prior object version), a data difference between the prior object version of the object and the object may be received as the file data (e.g., the file data may comprise difference data between a prior version and a current version of the file). A new object may be created within the second data constituent volume based upon the prior object version and the data difference. For example, the prior object version may be cloned to create a cloned object, and the data difference may be applied to the cloned object to create the new object. A new redirector for the new object may be created within the namespace volume. In this way, a dataset of one or more files from the file storage system may be efficiently migrated to the object storage system as objects because snapshots of datasets (e.g., a snapshot of a volume) may be processed during migration (e.g., as opposed to copying, converting, and storing files as objects on a file by file basis).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
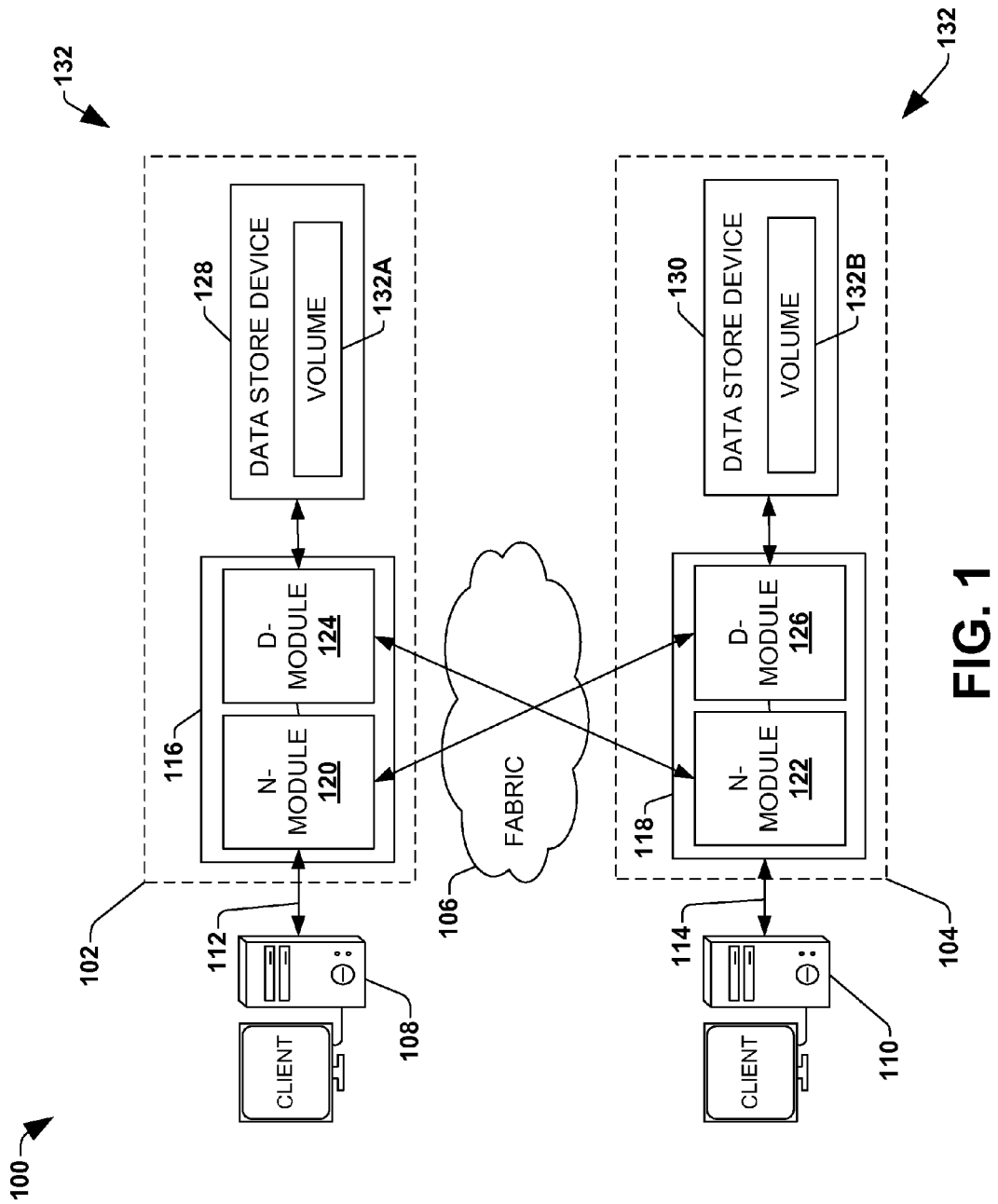
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A file storage system may store data as files within one or more volumes. Within a volume, one or more files may be stored within a file system associated with the volume. A file may be stored as an array of bytes, and may be referenced by a file name. In contrast, an object storage system may store data as objects within one or more constituent data volumes. Instead of limiting an object to a particular constituent data volume, the object may be moved between constituent data volumes. In particular, a namespace volume may comprise redirectors that track locations of objects within the object storage system (e.g., if an object is moved from a first data constituent volume to a second data constituent volume, then a redirector of the object may be updated to point to a new location of the object within the second data constituent volume). The object storage system may represent objects stored within the one or more data constituent volumes as a single front-end object volume to clients. The object storage system may be abstracted away from how the objects are actually stored within the one or more data constituent volumes. Because the object storage system stores data as objects, it may be difficult and/or inefficient to copy files from the file storage system to the object storage system (e.g., files may be copied file-by-file). Accordingly, as provided herein, a dataset may be migrated from the file storage system to the object storage system in an efficient manner.

To provide context for migrating a dataset from a file storage system to an object storage system, FIG. 1 illustrates an embodiment of a clustered network environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that in one example, a file storage system may be implemented within the clustered network environment 100. For example, one or more files may be stored within volume 132A of data store device 128, and one or more files may be stored within volume 132B of data store device 130. Node 116 and/or node 118 may provide client 108 and/or client 110 with access to such files. It may be appreciated that in another example, an object storage system may be implemented within the clustered network environment 100. For example, one or more objects may be stored within one or more data constituent volumes (e.g., volume 132A and/or volume 132B may be configured as data constituent volumes). Node 116 and/or node 118 may provide client 108 and/or client 110 with access to such objects.

Figure 2:
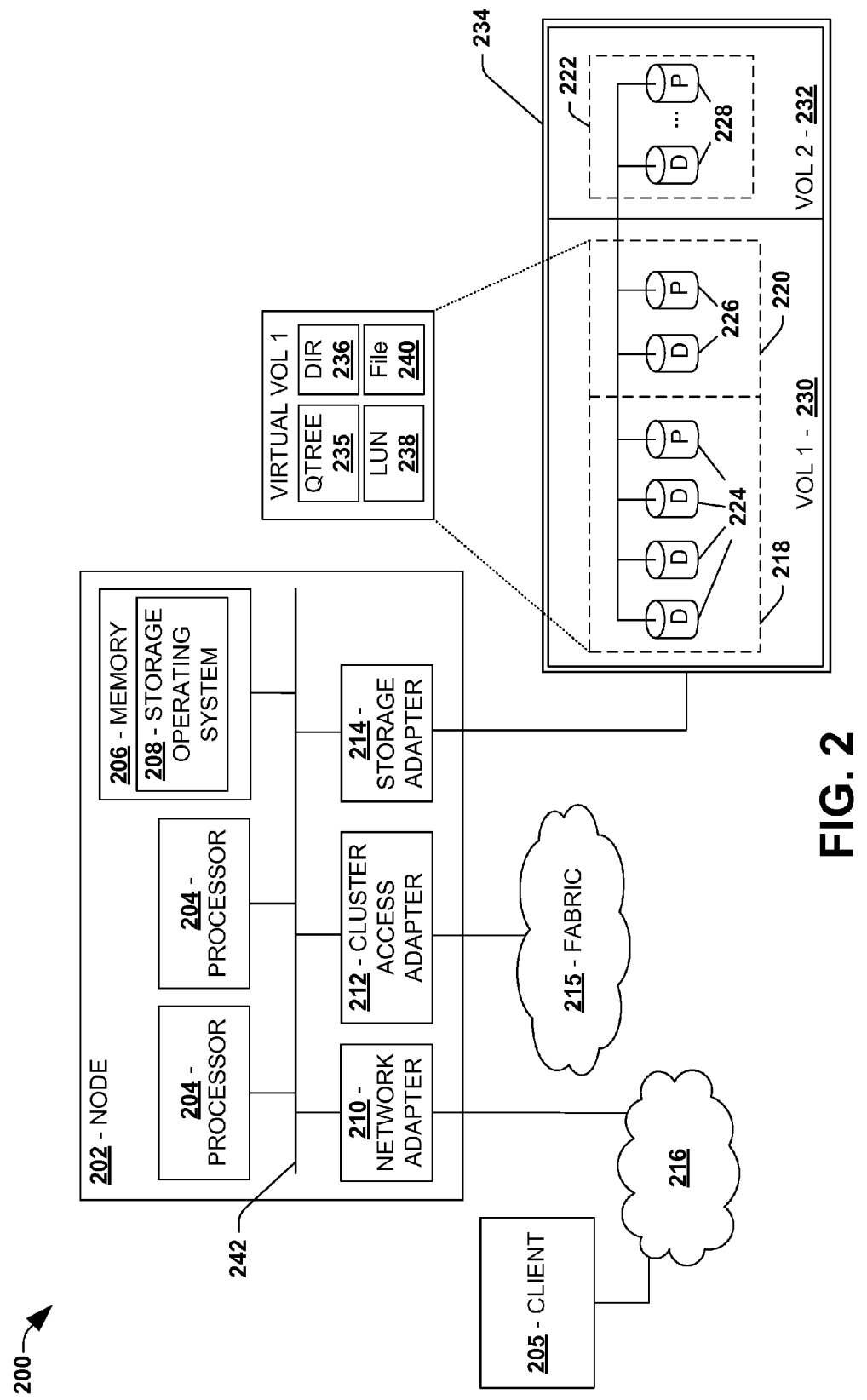
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can respond to client requests to manage data on the data storage device 234 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that in one example, a file storage system may be implemented within the data storage system 200. For example, one or more files may be stored within volume 230 and/or volume 232. Node 202 may provide client 205 with access to such files. It may be appreciated that in another example, an object storage system may be implemented within the data storage system 200. For example, one or more objects may be stored within one or more data constituent volumes (e.g., volume 230 and/or volume 232 may be configured as data constituent volumes). Node 202 may provide client 205 with access to such objects through an object volume (e.g., virtual volume 1) that corresponds to the one or more data constituent volumes. For example, node 202 may utilize a namespace volume, not illustrated, to translate front-end data paths (e.g., used by the client 205 to reference objects) to back-end data paths corresponding to location of the objects within the one or more data constituent volumes.

Figure 3:
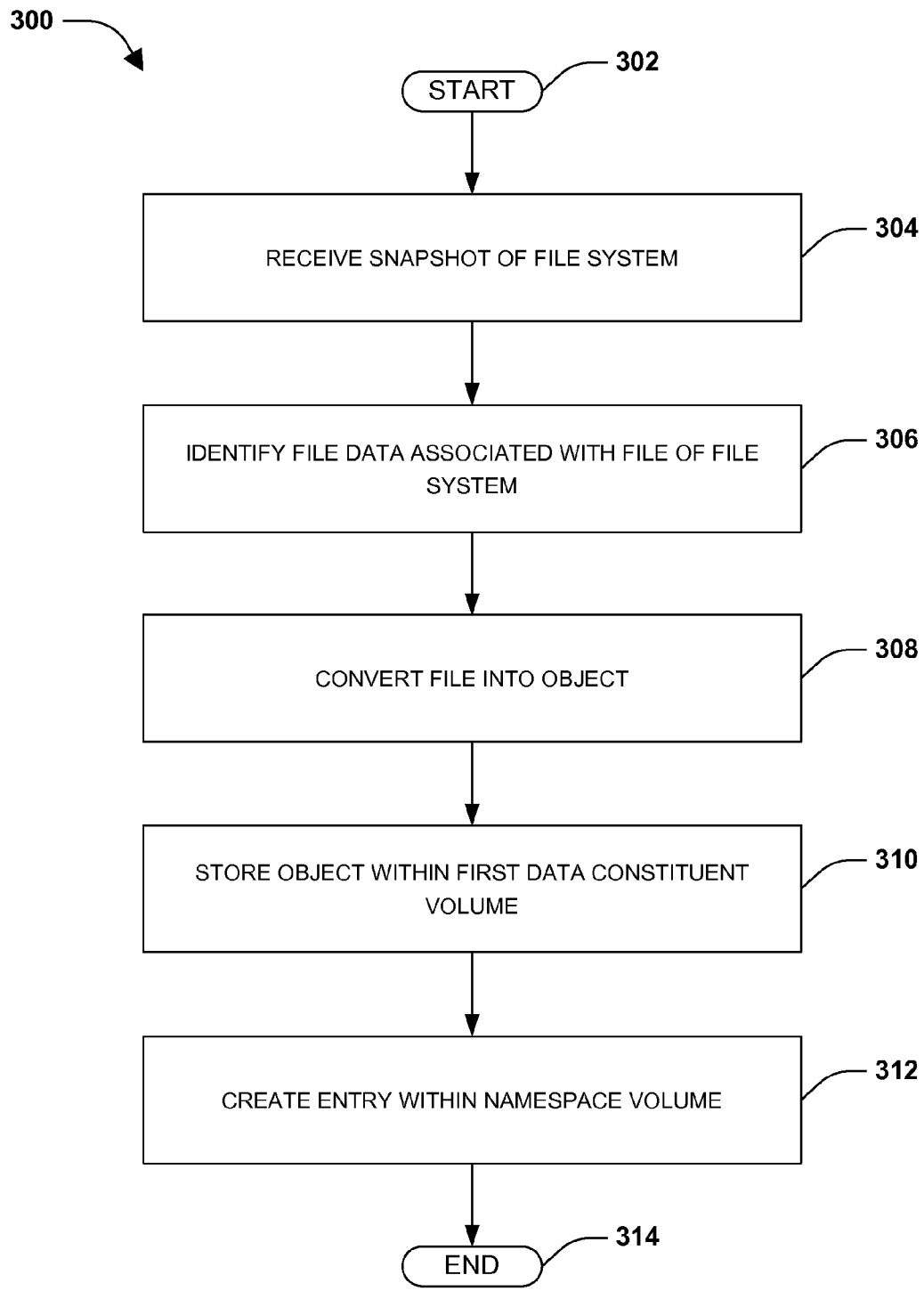
FIG. 3 is a flow chart illustrating an exemplary method of migrating a dataset from a file storage system to an object storage system.

One embodiment of migrating a dataset from a file storage system to an object storage system is illustrated by an exemplary method 300 of FIG. 3. At 302, the method starts. It may be appreciated that exemplary method 300 may correspond to migration of a file that has not already been stored as a prior object version within the object storage system, while exemplary method 400 may correspond to migration of a file that has already been stored as a prior object version within the object storage system. At 304, a snapshot of a file system may be received from a file storage system. It may be appreciated that one example of a file storage system is illustrated in example 500 of FIG. 5, and that one example of an object storage system is illustrated in example 600 of FIG. 6. In one example, the snapshot may be received through a data stream from the file storage system, such that D-blade (e.g., a data component) to N-blade (e.g., a network component) communication may be utilized to receive the snapshot without performing a complete traversal of a source stack that may be performed while using file protocols (e.g., a file protocol may translate from D-blade to N-blade to client, and then from client to N-blade to D-blade, etc.) and/or a mediating client for communication (e.g., where files are migrated on a per file basis). The snapshot may comprise a point in time representation of a volume associated with the file system, for example. In this way, the snapshot may comprise file data associated with one or more files of the file system.

At 306, file data associated with a file of the file system may be identified within the snapshot. In one example, the file data may comprise data of the file (e.g., an array of data bytes comprising data represented by the file), metadata of the file (e.g., information associated with ownership, creation time, modification time, etc.), and/or other information. At 308, the file may be converted into an object using the file data. In one example of converting the file into the object, an object layer (e.g., a data wrapper) may be added to the data of the file to create the object (e.g., the data wrapper may be wrapped around the data of the file to create the object). In this way, the object may be represented, by the object layer wrapped around the data of the file, as a single data glob that may be written and/or read as a single glob. In one example, metadata, such as user defined metadata and/or system defined metadata, may be specified for the object. The metadata may be attached to the object as attached metadata. Once the object is stored within the object storage system, the attached metadata may be used to locate the object within the object storage system. For example, a query corresponding to the attached metadata (e.g., a query corresponding to "user=Dan", "creation time=2/2/12", etc.) may be used to identify the object for retrieval.

Responsive to determining that a prior object version of the object does not exist within at least one data constituent volume, the object may be stored within a first data constituent volume of the object storage system, at 310. In one example, the first data constituent volume may be selected based upon a service level objective for the file. The service level objective may correspond to various objectives, such as a storage space efficiency objective, a reliability objective (e.g., the object may be stored within a volume configured according to a redundant configuration), a cost objective (e.g., the object may be stored within a relatively cost effective volume), a performance objective (e.g., the object may be stored within a relatively fast volume), a security objective, and/or other objectives. In this way, the first data constituent volume may be selected for storage of the object based upon the first data constituent volume comprising one or more characteristics (e.g., speed, security, redundancy, longevity, etc.) corresponding to the service level object.

The object storage system may comprise a namespace volume used to track locations of objects within the one or more data constituent volumes. For example, the namespace volume may comprise one or more entries associated with a plurality of data constituent volumes configured as a single front-end object volume that may be abstracted away from how object are actually stored within the object storage system. That is, a client may reference objects by using front-end data paths through the single front-end object volume. The namespace volume may be used to translate front-end data paths to back-end data paths that correspond to locations of such objects within the object storage system. In this way, when an object is moved between data constituent volumes, a back-end data path may be updated to a new location of the object, while the front-end data path may remain unchanged so that the user may continue to use the same front-end data path to reference the object.

At 312, an entry may be created within the namespace volume of the object storage system based upon the object being stored within the first data constituent volume. The entry may comprise a redirector mapping a front-end data path for the object to a back-end data path that specifies a path to the object within the first data constituent volume. In one example of creating the entry, an inode to path (I2P) data structure from the file system may be identified. The I2P data structure may comprise a mapping of an inode number to the file within the file system of the file storage system. The front-end data path may be defined based at least in part upon the mapping. For example, the front-end data path may comprise a storage cluster identifier (e.g., an identifier of a cluster of storage nodes that managed the file), a logical partition identifier (e.g., a virtual server that may have provided access to the file), a file system identifier (e.g., a volume within which the file was stored by the file system), a snapshot identifier (e.g., the snapshot comprising the file data of the file), and/or other identifiers associated with how the file was stored within the file system by the file storage system (e.g., an owner identifier). In this way, the file may be migrated from the file storage system to the object storage system as the object. Because the object storage system may maintain multiple data constituent volumes, the object may be moved from the first data constituent volume to a third data constituent volume, for example. In one example, the entry may correspond to source side identifiers (e.g., of the file system) used in naming the object (e.g., by basing the front-end data path on the source side identifiers), which may distinguish the object as belonging to a particular source (e.g., source1/vol1/FileA may be distinguished from source2/vol2/FileA). In another example, the entry may be used within the namespace to re-create a source side directory hierarchy (e.g., a directory of the file system comprising the file) at the destination (e.g., I2P information, such as directory/subdirectory/filename=inode number, may be used to re-create the source side directory hierarchy at the namespace volume (e.g., NS/cluster/vserver/volume/snapshotID hierarchy). In this way, the redirector within the namespace volume may be updated to map to the new location of the object within the third data constituent volume.

It may be appreciated that the dataset may comprise one or more files that may be migrated from the file storage system to the object storage system, and that some examples provided herein may describe migration of a single file for simplicity. For example, the snapshot may comprise a plurality of files within a volume of the file system. The plurality of files may be migrated from the file storage system into one or more data constituent volumes of the object storage system. In this way, files may be migrated from the file storage system to the object storage system as a dataset, as opposed to merely being migrated on a file by file basis, which may be inefficient and/or time consuming.

It may be appreciated that the dataset may comprise one or more snapshots of one or more file systems within the file storage system. For example, a plurality of snapshots may be received through one or more data streams. Priorities may be assigned to respective data streams (e.g., a first snapshot of a first file system received through a first data stream may be assigned a relatively high priority because the first file system may be actively used, while a second snapshot of a second file system received through a second data stream may be assigned a relatively low priority because the second file system may be inactive). The one or more data streams (e.g., and/or snapshots of the one or more data streams) may be queued for processing based upon priorities assigned to the data streams. In this way, files may be migrated from the file storage system to the object storage system as a dataset, as opposed to merely being migrated on a file by file basis, which may be inefficient and/or time consuming. At 314, the method ends.

Figure 4:
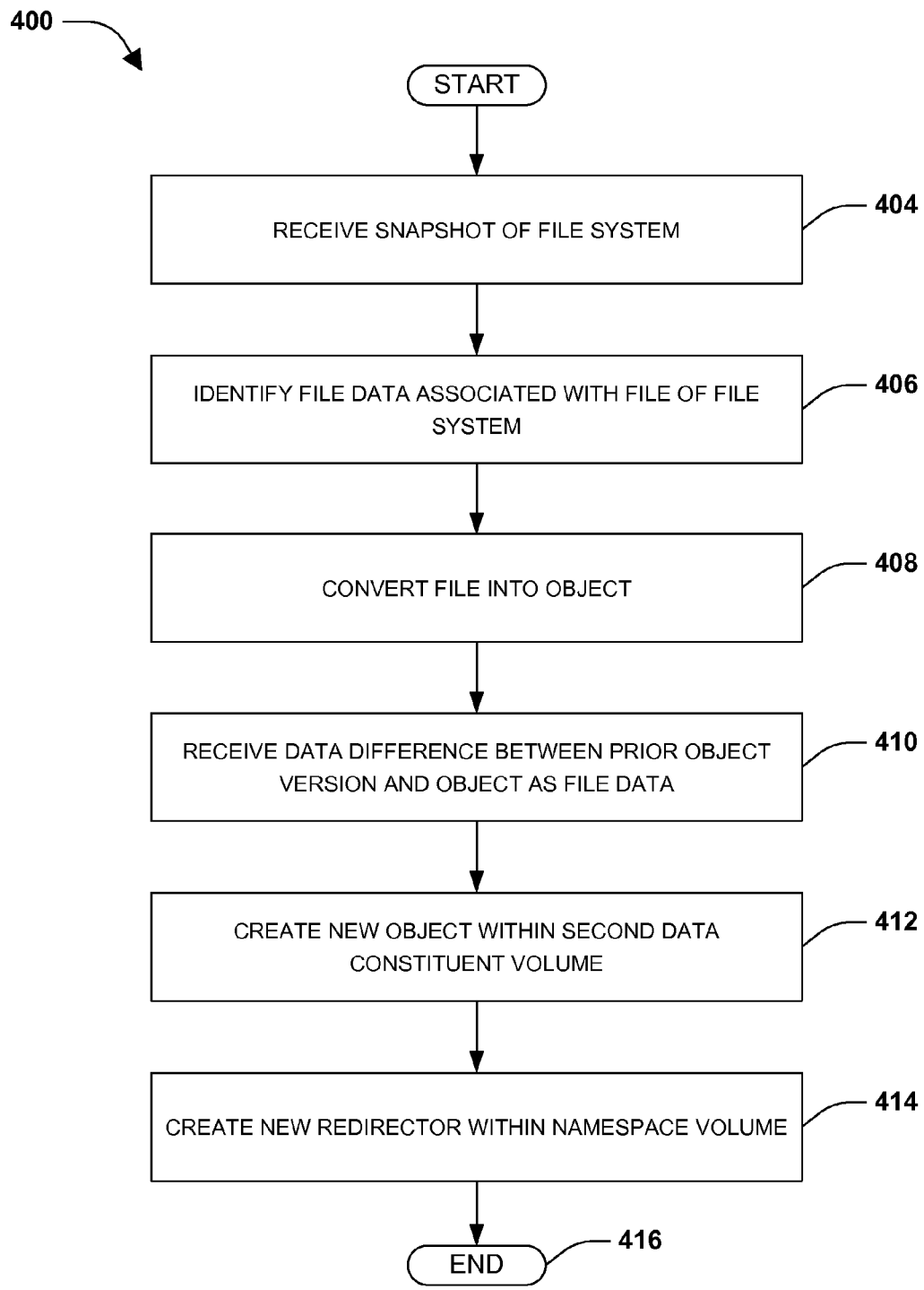
FIG. 4 is a flow chart illustrating an exemplary method of migrating a dataset from a file storage system to an object storage system.

One embodiment of migrating a dataset from a file storage system to an object storage system is illustrated by an exemplary method 400 of FIG. 4. At 402, the method starts. It may be appreciated that exemplary method 400 may correspond to migration of a file that has already been stored as a prior object version within the object storage system (e.g., a prior version of the file may have been stored as the prior object version). At 404, a snapshot of a file system may be received from a file storage system. It may be appreciated that one example of a file storage system is illustrated in example 500 of FIG. 5, and that one example of an object storage system is illustrated in example 600 of FIG. 6.

At 406, file data associated with a file of the file system may be identified within the snapshot. In one example, the file data may comprise a difference between a prior version and a current version of the file. For example, the file may comprise a text document. A prior version of the text document may comprise two paragraphs of text. The prior version of the text document may have been migrated to the object storage system as a prior object version. Subsequently, a new paragraph of text may be added to the text document as a current version of the file. Accordingly, the snapshot of the current version of the file may comprise the new paragraph (e.g., but may not comprise the two original paragraphs). In this way, snapshot difference functionality may be performed when migrating files from the file storage system to the object storage system.

At 408, the file may be converted into an object. In one example of converting the file into the object, an object layer (e.g., a data wrapper) may be added to the data of the file to create the object (e.g., the data wrapper may be wrapped around the data of the file to create the object). In this way, the object may be represented, by the object layer wrapped around the data of the file, as a single data glob that may be written and/or read as a single glob. It may be appreciated that 408 may be optionally performed and/or omitted. For example, difference data may be applied to a cloned object of the prior version object to create the new object (e.g., as opposed to converting the file into an object, and then utilizing difference data and the cloned object to create the new object).

Responsive to determining that the prior object version of the object does exist within at least one data constituent volume, such as a second data constituent volume, a data difference between the prior object version and the object may be received (e.g., identified within the file data of the snapshot based upon the difference between the prior version and the current version of the file), at 410. At 412, a new object may be created within the second data constituent volume based upon the prior object version and the data difference. For example, the prior object version may be cloned to create a cloned object (e.g., the cloned object may comprise the two original paragraphs of the text document). The data difference may be applied to the cloned object to create the new object (e.g., the new object may comprise pointers to the two original paragraphs and the new paragraph). In this way, snapshot difference functionality may be performed so that merely data differences may be migrated to the object storage system as opposed to storing redundant object data. At 414, a new redirector for the new object may be created within the namespace volume. In this way, the new redirector may be used to locate the new object within the second data constituent volume. At 416, the method ends.

Figure 5:
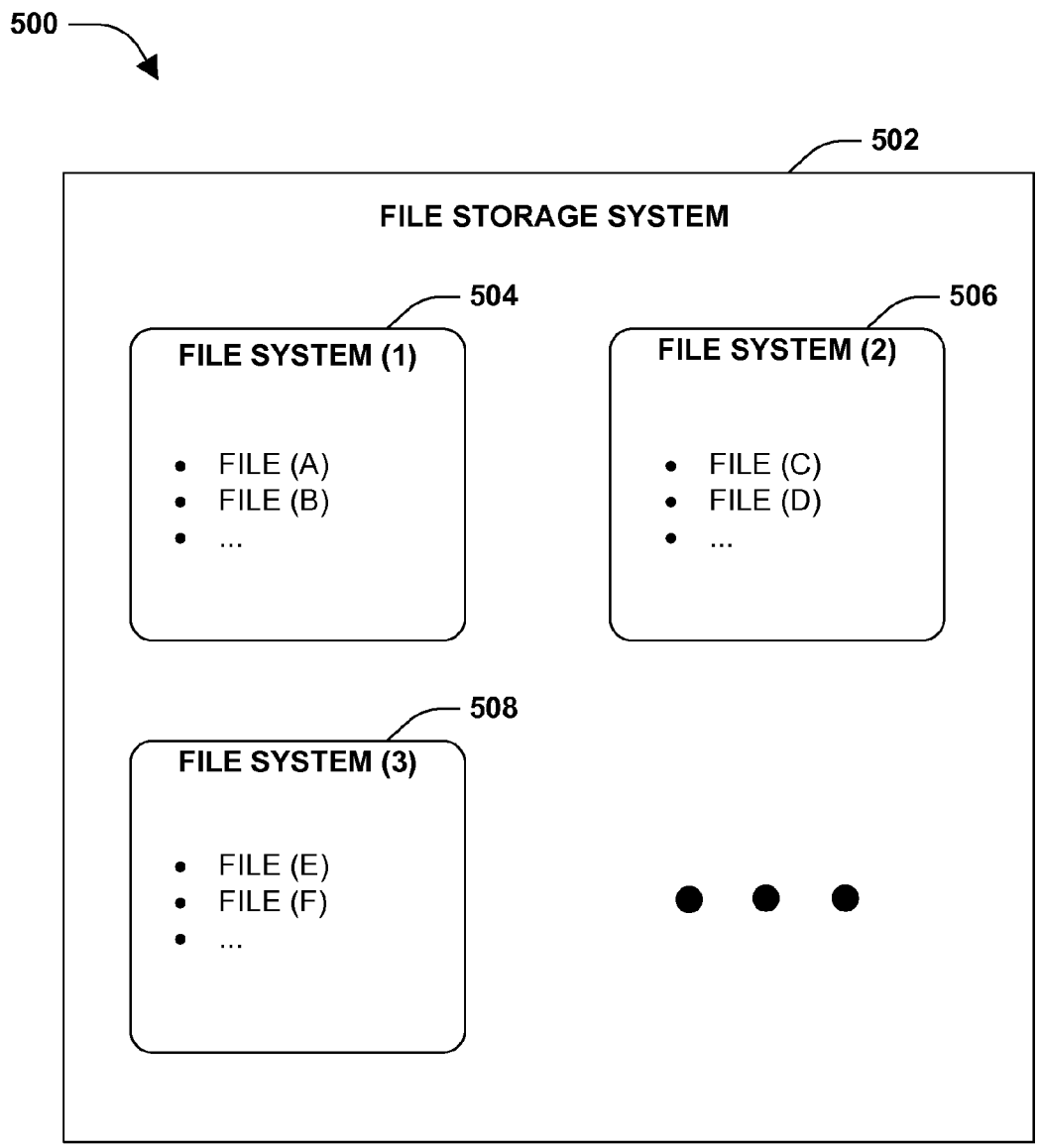
FIG. 5 is an illustration of an example of a file storage system.

FIG. 5 illustrates an example 500 of a file storage system 502. The file storage system 502 may store data as files within one or more file systems. In one example, file (a), file (b), and/or other files not illustrated may be stored within a volume associated with file system (1) 504. File (c), file (d), and/or other files not illustrated may be stored within a volume associated with file system (2) 506. File (e), file (f), and/or other files not illustrated may be stored within a volume associated with file system (3) 508. The file storage system 502 may store a file within a file system as an array of bytes, and may reference the file by a file name (e.g., and/or an inode associated with the file).

The file storage system 502 may provide storage functionality, such as snapshot backup functionality and/or snapshot difference functionality, within the context of volumes. For example, the file storage system 502 may create a snapshot of the volume associated with the file system (1) 504 for backup. Unfortunately, the file storage system 502 may be merely able to perform a restore from the snapshot at the same volume or a volume that has a pre-existing pairing relationship with the volume (e.g., a secondary volume that is designated as a backup storage volume for a primary volume). Accordingly, it may be advantageous to migrate files from the file storage system 502 to an object storage system (e.g., object storage system 602 of FIG. 6) that may provide flexibility in performing storage functionality that is not limited to volume boundaries.

Figure 6:
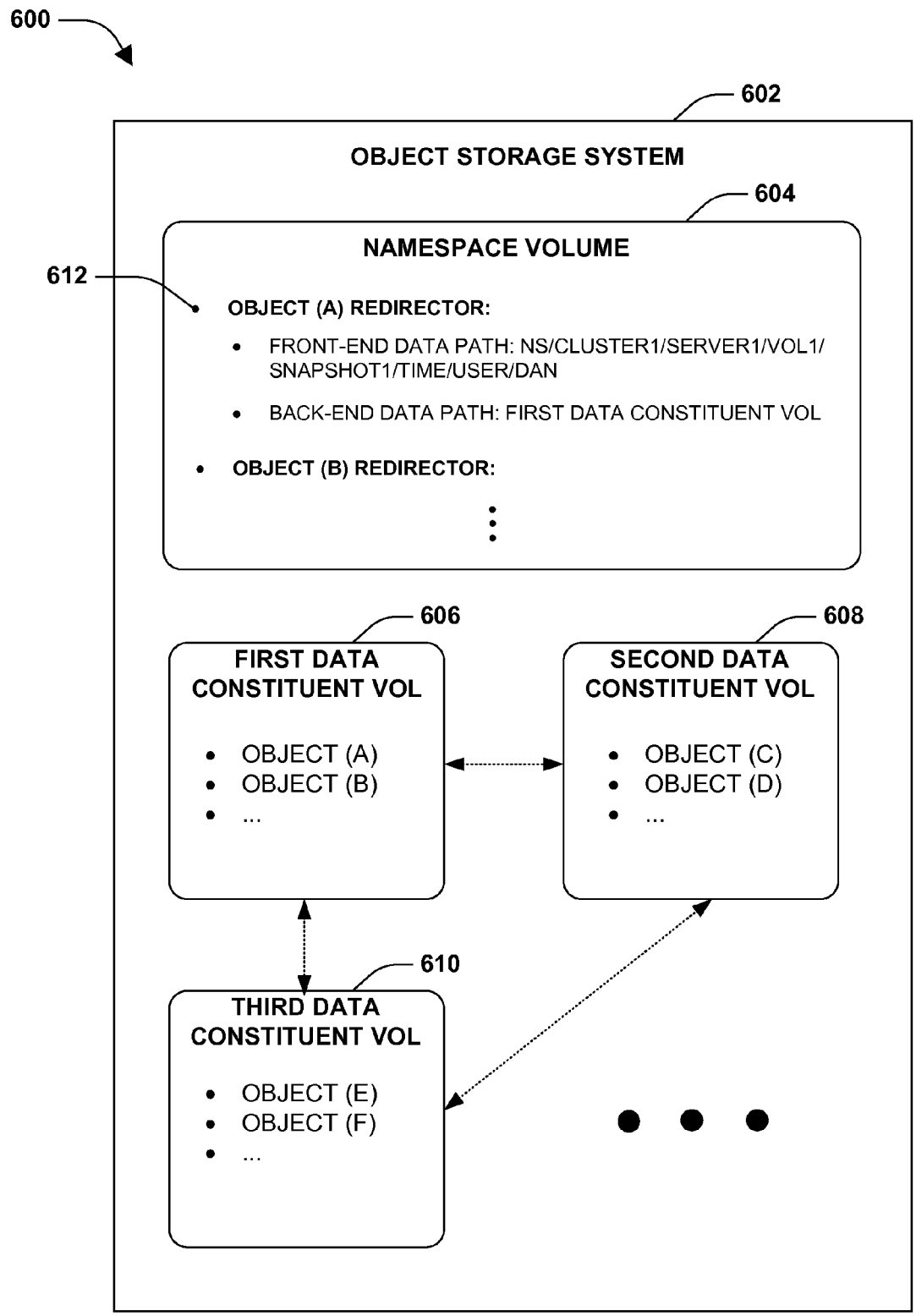
FIG. 6 is an illustration of an example of an object storage system.

FIG. 6 illustrates an example 600 of an object storage system 602. The object storage system 602 may store data as objects across one or more data constituent volumes. In one example, object (A), object (B), and/or other objects not illustrated may be stored within a first data constituent volume 606. Object (C), object (D), and/or other objects not illustrated may be stored within a second data constituent volume 608. Object (E), object (F), and/or other objects not illustrated may be stored within a third data constituent volume 610.

Because the object storage system 602 may store objects with any data constituent volume and/or may move objects between data constituent volumes, the object storage system 602 may maintain a namespace volume 604 used to track locations of objects within the one or more data constituent volumes. For example, the namespace volume 604 may comprise an object (A) redirector 612 for object (A). The object (A) redirector 612 may map a front-end data path for the object (e.g., a data path used by a client to reference the object) to a back-end data path specifying a path to the object within the first data constituent volume 606. If object (A) is move from the first data constituent volume 606 to a different data constituent volume, such as the third data constituent volume, then the object storage system 602 may update the back-end data path within the object (A) redirector 612 to point to the location of the object (A) within the third data constituent volume 610 (e.g., the third data constituent volume 610 may have additional network bandwidth resources in comparison with the first data constituent volume 606). However, the front-end data path may remain unchanged so that clients may continue to use the same front-end data path to reference the object (A). In this way, the object storage system 602 is not limited to storing objects according to a volume concept, but may provide flexible storage of objects within the one or more data constituent volumes.

Figure 7:
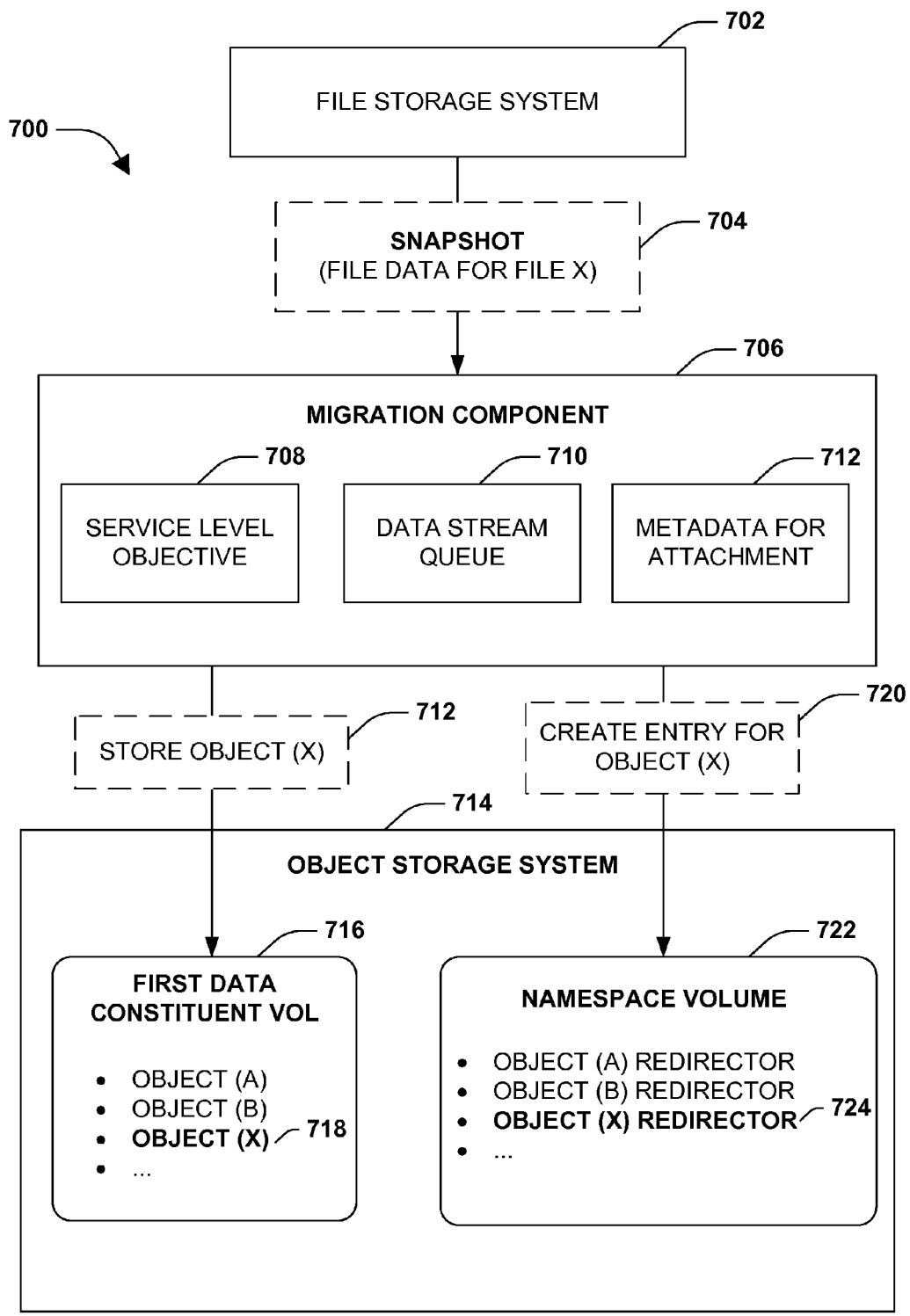
FIG. 7 is a component block diagram illustrating an exemplary system for migrating a dataset from a file storage system to an object storage system.

FIG. 7 illustrates an example of a system 700 configured for migrating a dataset from a file storage system 702 to an object storage system 714. The system 700 may comprise a migration component 706. The migration component 706 may be configured to receive a dataset, such as one or more snapshots of file systems, associated with the file storage system 702. For example, the migration component 706 may receive a snapshot 704. The snapshot 704 may comprise file data for a file (X) of a file system within the file storage system 702. The file data may comprise data of the file (X), metadata for the file (X), and/or other information associated with the storage of file (X) by the file storage system 702. In one example of receiving the snapshot 704, the snapshot 704 may be received through a data stream. The migration component 706 may queue the data stream within a data stream queue 710 for processing based upon a priority assigned to the data stream. In this way, the snapshot 704 may be processed based upon the priority of the data stream (e.g., the snapshot 704 may be queued toward a front of the data stream queue 710 based upon the data stream corresponding to a relatively high priority file system).

The migration component 706 may be configured to convert the file (X) into an object (X). For example, the migration component 706 may wrap the data of file (X) with a data wrapper to create the object (X). In one example, the migration component 706 may associate metadata 712 (e.g., user defined metadata and/or system defined metadata) with the object (X). The migration component 706 may be configured to select a data constituent volume within the object storage system 714 for storage of the object (X). In one example, the migration component 706 may select a first data constituent volume 716 based upon a service level objective 708 identified for the file (X) (e.g., the first data constituent volume 716 may comprise security characteristics that correspond to a security objective defined within the service level object 708). In this way, the migration component 706 may store 712 the object (X) within the first data constituent volume 716 as object (X) 718.

The migration component 706 may track the location of object (X) 718 by maintaining an object (X) redirector 724 within a namespace volume 722 maintained by the object storage system 714. For example, the migration component 706 may create 720 an entry, comprising the object (X) redirector 724, within the namespace volume 722. The object (X) redirector 724 may map a front-end data path for the object (X) 718 (e.g., a data path used by clients to reference the object (X) 718) to a back-end data path specifying a path to the object (X) 718 within the first data constituent volume 716. If the object (X) 718 is moved from the first data constituent volume 716 to a different data constituent volume, the back-end data path within the object (X) redirector 724 may be updated to reflect the new location of the object (X) 718. In this way, the migration component 706 may migrate one or more files within the snapshot 704 and/or other snapshots not illustrated from the file storage system 702 to the object storage system 714.

Figure 8:
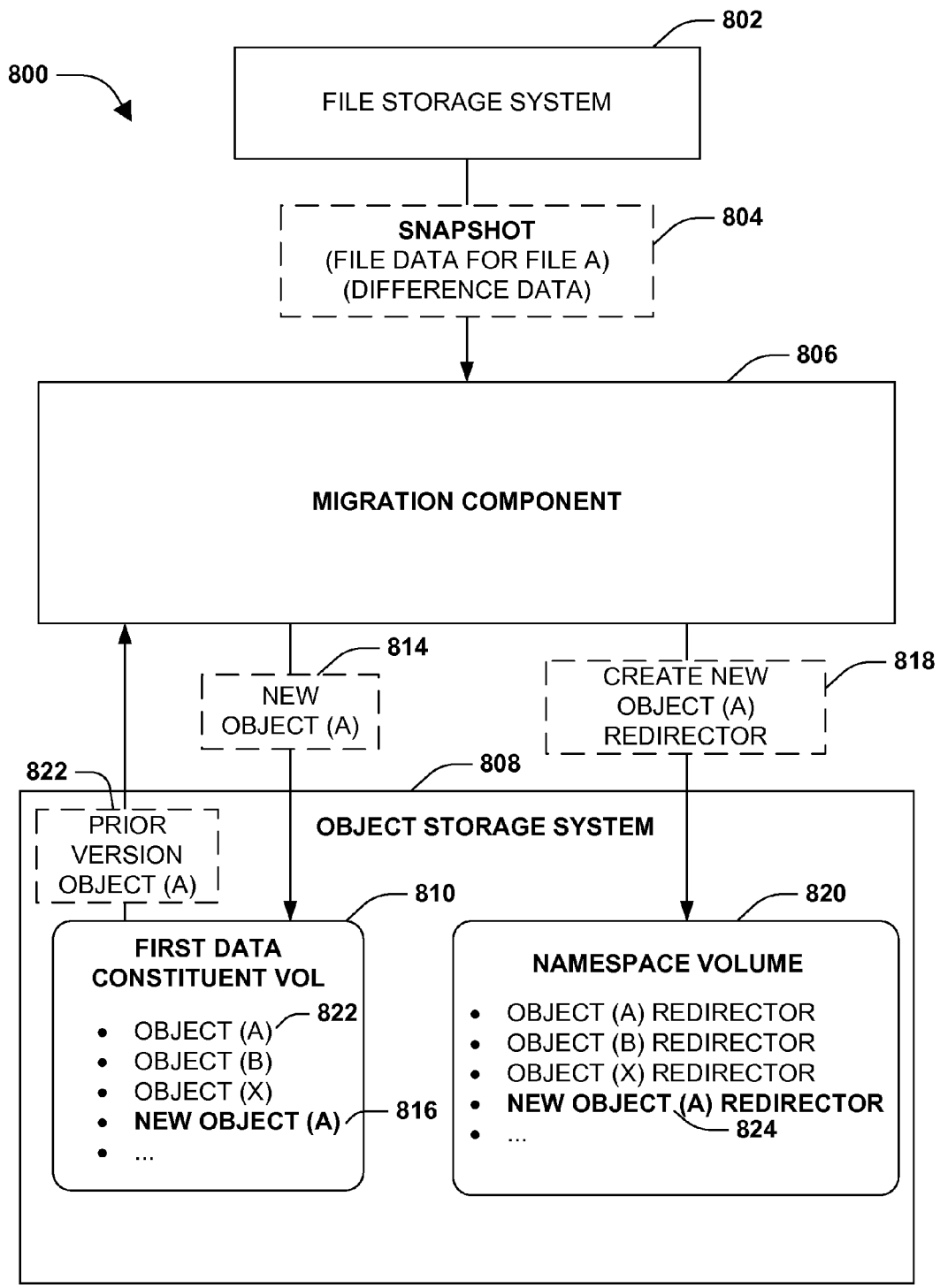
FIG. 8 is a component block diagram illustrating an exemplary system for migrating a dataset from a file storage system to an object storage system.

FIG. 8 illustrates an example of a system 800 configured for migrating a dataset from a file storage system 802 to an object storage system 808. The system 800 may comprise a migration component 806. The migration component 806 may be configured to receive a dataset, such as one or more snapshots of file systems, associated with the file storage system 802. For example, the migration component 806 may receive a snapshot 804. The snapshot 804 may comprise file data for a file (A) of a file system within the file storage system 802. Because file (A) may have been previously migrated to the object storage system 808 as a prior object version (e.g., prior object version (A) 822 within first data constituent volume 810), the file data for file (A) may comprise a data difference between a prior version and a current version of file (A), which may correspond to a difference between the prior object version (A) 822 of object (A) and the current version of object (A) that is to be migrated to the object storage system 808.

The migration component 806 may select the first data constituent volume 810 for storage of a new object (A) based upon a determination that the prior object version (A) 822 is stored within the first data constituent volume 810 and/or for other reasons, for example. Accordingly, the migration component 806 may obtain the prior object version (A) 822 from the first data constituent volume 810. The migration component 806 may clone the prior object version (A) 822 to create a cloned object. The migration component 806 may apply the data difference to the cloned object to create a new object (A). The migration component 806 may store 814 the new object (A) within the object storage system 808 as new object (A) 816. The migration component 806 may track the location of new object (A) 816 by maintaining a new object (A) redirector 824 within a namespace volume 820 maintained by the object storage system 808. For example, the migration component 806 may create 818 an entry, comprising the new object (A) redirector 822, within the namespace volume 820. The new object (A) redirector 824 may map a front-end data path for the new object (A) 816 to a back-end data path specifying a path to the new object (A) 816 within the first data constituent volume 810.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Figure 9:
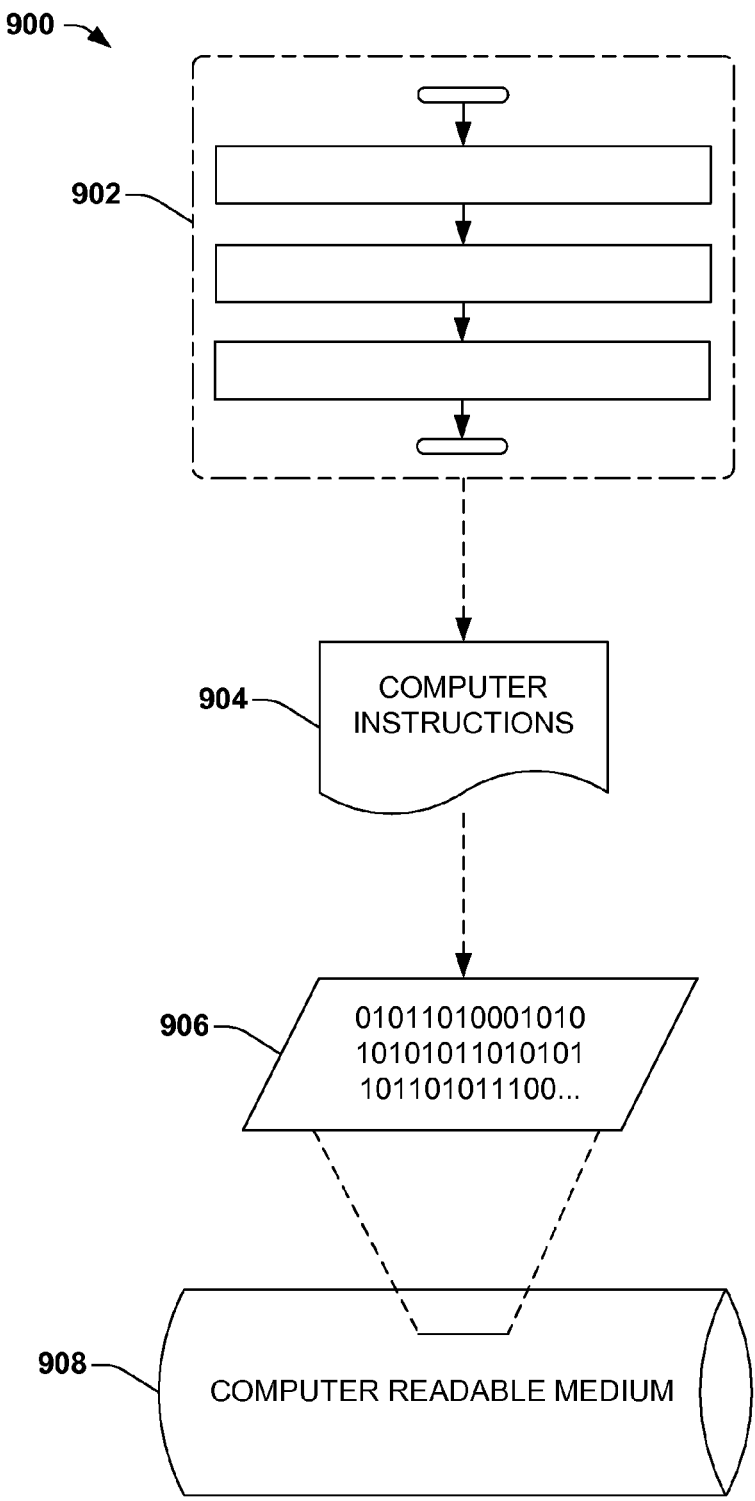
FIG. 9 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 9, where the implementation 900 comprises a computer-readable medium 908 (e.g., a CD-R, DVD-R, platter of a hard disk drive, flash drive, etc.), on which is encoded computer-readable data 906. This computer-readable data 906 in turn comprises a set of computer instructions 904 configured to operate according to the principles set forth herein. In one such embodiment, the processor-executable instructions 904 may be configured to perform a method 902, such as at least some of the method 300 of FIG. 3 and/or at least some of method 400 of FIG. 4, for example, and/or at least some of a system, such as at least some of the system 700 of FIG. 7 and/or at least some of system 800 of FIG. 8, for example. Many such computer-readable media may be devised by those of ordinary skill in the art that are configured to operate in accordance with the techniques presented herein.

Although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. Furthermore, to the extent that the terms "includes", "having", "has", "with", or variants thereof are used in either the detailed description or the claims, such terms are intended to be inclusive in a manner similar to the term "comprising." Also, "exemplary" means an example, not the best; "or" is intended to be inclusive not exclusive; "a" and/or "an" mean "one or more" unless specified otherwise and/or clear from context to be directed to a singular form; and at least one of A and B and/or the like generally means A or B or both A and B.

What is claimed is:

1. A method for migrating a dataset from a file storage system to an object storage system by converting a file to an object, comprising:
   identifying file data associated with a file of a file system of a file storage system;
   converting the file into an object using the file data;
   responsive to determining that a prior object version of the object does not exist within at least one data constituent volume of an object storage system:
      storing the object within a first data constituent volume of the object storage system;
      creating an entry within a namespace volume associated with the object storage system, the entry comprising a redirector mapping a front-end data path for the object to a back-end data path, the back-end data path specifying a path to the object within the first data constituent volume; and
      updating the redirector to map to a new location of the object within a third data constituent volume responsive to the object being moved from the first data constituent volume to the third data constituent volume; and
   responsive to determining that the prior object version of the object does exist within a second data constituent volume of the object storage system:
      receiving a data difference between the prior object version and the object;
      creating a new object within the second data constituent volume based upon the prior object version and the data difference, the creating a new object comprising:
         cloning the prior object version to create a cloned object; and
         applying the data difference to the cloned object to create the new object; and
      creating a new redirector, within the namespace volume, for the new object.

2. The method of claim 1, the storing the object within a first data constituent volume comprising:
   identifying a service level objective for the file; and
   selecting the first data constituent volume for storage of the object based upon the first data constituent volume comprising one or more characteristics that correspond to the service level objective.

3. The method of claim 2, the service level objective comprising at least one of:
   a storage space efficiency objective;
   a reliability objective;
   a security objective;
   a cost objective; or
   a performance objective.

4. The method of claim 1, comprising:
   migrating a second file from a second file system into the first data constituent volume as a second object.

5. The method of claim 1, comprising:
   migrating a second file from a second file system into the second data constituent volume as a second object.

6. The method of claim 1, the identifying file data comprising:
   evaluating a snapshot of the file system to identify the file data.

7. The method of claim 1, the front-end data path comprising at least one of a storage cluster identifier, a logical partition identifier, a file system identifier, or a snapshot identifier.

8. The method of claim 1, the creating an entry within a namespace volume comprising:
   identifying an inode to path (I2P) data structure from the file system, the I2P data structure comprising a mapping of an inode to the file; and
   defining the front-end data path based at least in part upon the mapping.

9. The method of claim 1, the namespace volume comprising one or more entries associated with a plurality of data constituent volumes configured as a single front-end object volume.

10. The method of claim 1, the identifying file data comprising:
    utilizing D-blade to N-blade communication without performing a complete traversal of a source stack.

11. The method of claim 1, comprising:
    migrating a plurality of files, comprised within a snapshot of the file system, from the file storage system into one or more data constituent volumes of the object storage system.

12. The method of claim 1, comprising:
    receiving a plurality of snapshots through one or more data streams;
    assigning a priority to respective data streams; and
    queuing the one or more data streams for processing based upon priorities assigned to respective data streams.

13. The method of claim 1, the storing the object, comprising:
    associating at least one of user defined metadata or system defined metadata with the object as attached metadata.

14. The method of claim 13, comprising:
    querying the object based upon a metadata query corresponding to at least some of the attached metadata.

15. A system for migrating a dataset from a file storage system to an object storage system by converting a file to an object, comprising:
    a migration component configured to:
       identify file data associated with a file of a file system of a file storage system;
       convert the file into an object using the file data;
       responsive to determining that a prior object version of the object does not exist within at least one data constituent volume of an object storage system:
          store the object within a first data constituent volume of the object storage system;
          create an entry within a namespace volume associated with the object storage system, the entry comprising a redirector mapping a front-end data path for the object to a back-end data path, the back-end data path specifying a path to the object within the first data constituent volume; and
          invoke an object management component to update the redirector to map to a new location of the object within a third data constituent volume responsive to the object being moved from the first data constituent volume to the third data constituent volume; and responsive to determining that the prior object version of the object does exist within a second data constituent volume of the object storage system:
  receive a data difference between the prior object version and the object as the file data;
  create a new object within the second data constituent volume based upon the prior object version and the data difference, comprising:
    cloning the prior object version to create a cloned object; and
    applying the data difference to the cloned object to create the new object; and
  create a new redirector, within the namespace volume, for the new object.

16. The system of claim 15, the migration component configured to:
  identify a service level objective for the file; and
  select the first data constituent volume for storage of the object based upon the first data constituent volume comprising one or more characteristics that correspond to the service level objective.

17. The system of claim 16, the service level objective comprising at least one of:
  a storage space efficiency objective;
  a reliability objective;
  a security objective;
  a cost objective; or
  a performance objective.

18. The system of claim 15, the migration component configured to:
  receive a plurality of snapshots through one or more data streams;
  assign priorities to the one or more data streams; and
  queue the one or more data streams for processing based upon the assigned priorities.

19. The system of claim 15, the migration component configured to:
  identify an inode to path (I2P) data structure from the file system, the I2P data structure comprising a mapping of an inode to the file; and
  define the front-end data path based at least in part upon the mapping.

20. A computer-readable medium comprising processor-executable instructions that when executed perform a method for migrating a dataset from a file storage system to an object storage system by converting a file to an object, comprising:
  identifying file data associated with a file of a file system of a file storage system;
  converting the file into an object using the file data;
  responsive to determining that a prior object version of the object does not exist within at least one data constituent volume of an object storage system:
    storing the object within a first data constituent volume of the object storage system;
    creating an entry within a namespace volume associated with the object storage system, the entry comprising a redirector mapping a front-end data path for the object to a back-end data path, the back-end data path specifying a path to the object within the first data constituent volume; and
    updating the redirector to map to a new location of the object within a third data constituent volume responsive to the object being moved from the first data constituent volume to the third data constituent volume; and
  responsive to determining that the prior object version of the object does exist within a second data constituent volume of the object storage system:
    receiving a data difference between the prior object version and the object;
    creating a new object within the second data constituent volume based upon the prior object version and the data difference, the creating a new object comprising:
      cloning the prior object version to create a cloned object; and
      applying the data difference to the cloned object to create the new object; and
    creating a new redirector, within the namespace volume, for the new object.

* * * * *